(12) United States Patent
Agarwal et al.

(10) Patent No.: US 9,646,350 B1
(45) Date of Patent: May 9, 2017

(54) SYSTEM, METHOD, AND COMPUTER PROGRAM FOR PERFORMING OPERATIONS ON NETWORK FILES INCLUDING CAPTURED BILLING EVENT INFORMATION

(71) Applicant: Amdocs Software Systems Limited, Dublin (IE)

(72) Inventors: Amit Agarwal, Pune (IN); Eyal Rot, Modi'in-Maccabim-Re'ut (IL); Yael Cohen, Tel Aviv (IL); Sanjay Bhatia, Pune (IN)

(73) Assignees: Amdocs Software Systems Limited, Dublin (IE); Amdocs Development Limited, Limassol (CY)

( * ) Notice: Subject to any disclaimer, the term of this patent is extended or adjusted under 35 U.S.C. 154(b) by 59 days.

(21) Appl. No.: 14/597,155

(22) Filed: Jan. 14, 2015

(51) Int. Cl.
  *G07F 19/00* (2006.01)
  *H04M 15/00* (2006.01)
  (Continued)

(52) U.S. Cl.
  CPC ............ *G06Q 40/12* (2013.12); *H04L 43/04* (2013.01)

(58) Field of Classification Search
  CPC .......... H04L 29/00–29/06; H04L 67/42; H04L 67/1097; H04L 67/1095; H04L 41/145;
  (Continued)

(56) References Cited

U.S. PATENT DOCUMENTS

| 6,625,590 B1 * | 9/2003 | Chen ................... G06F 9/45512 707/956 |
| 6,854,010 B1 * | 2/2005 | Christian ............... G06Q 10/10 709/219 |

(Continued)

FOREIGN PATENT DOCUMENTS

CA 2613701 A1 1/2007

OTHER PUBLICATIONS

M. Pias, S. Wilbur, S. Bhatti and J. Crowcroft, "Securing the Internet metering and billing," Global Telecommunications Conference, 2002. GLOBECOM '02. IEEE, 2002, pp. 1603-1607 vol. 2. doi: 10.1109/GLOCOM.2002.1188468.*

(Continued)

*Primary Examiner* — Olusegun Goyea
(74) *Attorney, Agent, or Firm* — Zilka-Kotab, PC

(57) ABSTRACT

A system, method, and computer program product are provided for performing operations on network files including captured billing event information. In use, at least one network file is generated in response to a data capture command associated with a communications network, the at least one network file including information associated with a plurality of billing events corresponding to the communication network. Additionally, user input is received to perform at least one operation corresponding to the at least one network file, the at least one operation including at least one of: editing the at least one network file; filtering the at least one network file, based on configurable criteria; replaying at least a portion of the plurality of billing events included in (Continued)

the at least one network file; and generating an event template utilizing at least a portion of the information associated with the plurality of billing events. Further, the at least one operation corresponding to the at least one network file is performed online in accordance with the user input.

8 Claims, 5 Drawing Sheets

(51) Int. Cl.
*G06Q 40/00* (2012.01)
*H04L 12/26* (2006.01)

(58) Field of Classification Search
CPC ....... H04L 41/147; H04L 12/24; H04L 12/50; H04L 63/0272; H04L 63/1416; G06F 15/16; G06F 15/173; G06F 12/00; G06F 19/00; G06F 3/00; G06F 19/328; H04M 11/00; H04M 3/424; H04W 24/02; H04W 40/02
USPC ................ 709/211–229, 250; 707/610, 813; 370/255, 352, 235, 241, 360; 705/2; 379/90.01, 210.01; 455/419, 423
See application file for complete search history.

(56) References Cited

U.S. PATENT DOCUMENTS

| | | | | | |
|---|---|---|---|---|---|
| 6,950,845 | B2* | 9/2005 | Givoly | .............. | G06F 17/30286 379/201.03 |
| 6,985,956 | B2* | 1/2006 | Luke | .................. | G06F 11/2089 709/216 |
| 7,089,293 | B2* | 8/2006 | Grosner | .................. | H04L 29/06 370/364 |
| 7,313,614 | B2* | 12/2007 | Considine | ........... | G06F 11/2074 709/217 |
| 7,865,596 | B2* | 1/2011 | Grosner | ............ | G06F 17/30067 709/213 |
| 7,958,199 | B2* | 6/2011 | Ferrari | .................... | H04L 29/06 370/396 |
| 8,050,391 | B1* | 11/2011 | Andreasen | ........... | G06Q 20/102 370/261 |
| 8,346,956 | B2* | 1/2013 | Day | ...................... | H04L 63/102 370/235 |
| 8,352,777 | B2* | 1/2013 | Shilon | ................. | H04L 12/2697 370/235 |
| 8,572,260 | B2* | 10/2013 | Pyatkovskiy | ........... | H04L 43/50 709/223 |
| 8,666,759 | B2* | 3/2014 | Eckert | .................... | G06Q 10/10 705/2 |
| 8,819,245 | B2* | 8/2014 | Pyatkovskiy | ......... | H04L 12/413 709/222 |
| 8,856,869 | B1* | 10/2014 | Brinskelle | ............... | H04L 63/08 726/12 |
| 8,949,471 | B2* | 2/2015 | Hall | ........................ | H04L 29/06 709/250 |
| 2002/0082892 | A1* | 6/2002 | Raffel | .................. | G06Q 10/063 705/7.26 |
| 2003/0101357 | A1* | 5/2003 | Ronen | ................. | H04L 63/0272 726/23 |
| 2004/0010473 | A1* | 1/2004 | Hsu | ........................ | G06Q 10/10 705/77 |
| 2004/0230763 | A1* | 11/2004 | Cohen | ................. | G06F 11/3466 711/170 |
| 2005/0265321 | A1* | 12/2005 | Rappaport | ............ | H04L 41/145 370/352 |
| 2006/0112176 | A1* | 5/2006 | Liu | .................... | H04L 29/12066 709/245 |
| 2007/0006226 | A1* | 1/2007 | Hendel | ............... | G06F 9/45533 718/1 |
| 2007/0027929 | A1* | 2/2007 | Whelan | ............ | G06F 17/30126 |
| 2007/0248029 | A1* | 10/2007 | Merkey | ................... | H04L 43/02 370/255 |
| 2008/0118047 | A1* | 5/2008 | Nachum | .............. | H04Q 3/0079 379/210.01 |
| 2009/0041011 | A1* | 2/2009 | Sheppard | .............. | H04L 63/306 370/360 |
| 2009/0150372 | A1* | 6/2009 | Batista Reyes | ... | G06F 17/30864 |
| 2009/0182953 | A1* | 7/2009 | Merkey | ................... | H04L 43/02 711/136 |
| 2009/0192761 | A1* | 7/2009 | Pearl | .................... | G06F 11/3414 702/182 |
| 2009/0219829 | A1* | 9/2009 | Merkey | ................... | H04L 43/02 370/252 |
| 2010/0058366 | A1* | 3/2010 | Swildens | ............ | G06F 11/3414 719/329 |
| 2010/0195538 | A1* | 8/2010 | Merkey | ................... | H04L 43/02 370/255 |
| 2011/0153362 | A1* | 6/2011 | Valin | ................... | G06Q 20/105 705/3 |
| 2011/0225458 | A1* | 9/2011 | Zuo | ....................... | G06F 11/362 714/37 |
| 2011/0225459 | A1* | 9/2011 | Fahrig | .................. | G06F 11/366 714/37 |
| 2011/0276610 | A1* | 11/2011 | Hossain | ............ | G06F 17/30607 707/813 |
| 2012/0231785 | A1* | 9/2012 | Poon | ..................... | H04W 24/04 455/423 |
| 2012/0281540 | A1* | 11/2012 | Khan | .................... | H04L 45/308 370/241 |
| 2013/0185602 | A1* | 7/2013 | Jalaldeen | ............ | G06F 11/0778 714/48 |
| 2013/0336118 | A1* | 12/2013 | Shaw | .................. | H04L 41/0813 370/235 |
| 2014/0024361 | A1* | 1/2014 | Poon | ..................... | H04W 12/06 455/419 |
| 2014/0278471 | A1* | 9/2014 | Alibakhsh | ............. | G06F 19/328 705/2 |
| 2015/0032691 | A1* | 1/2015 | Hall | ........................ | H04L 29/06 707/610 |

OTHER PUBLICATIONS

R. Parhonyi, D. Quartel and A. Pras, "A provider based accounting architecture," IEEE Workshop on IP Operations and Management, 2002, pp. 49-53. doi: 10.1109/IPOM.2002.1045755.*

* cited by examiner

SYSTEM, METHOD, AND COMPUTER PROGRAM FOR PERFORMING OPERATIONS ON NETWORK FILES INCLUDING CAPTURED BILLING EVENT INFORMATION

FIELD OF THE INVENTION

The present invention relates to communication networks, and more particularly billing systems associated with such networks.

BACKGROUND

Telecommunication billing is based on events received from the communication network. Each time an event occurs over a network, the event triggers corresponding logic of billing systems based on usage parameters received in the event in real time streaming. To date, network files that can be generated as a result of such events are only of limited use. For example, there currently is not a way to filter events in such files to access desired data, or to edit the event data to generate test scenarios, or to simulate the streaming events from those files, etc.

There is thus a need for addressing these and/or other issues associated with the prior art.

SUMMARY

A system, method, and computer program product are provided for performing operations on network files including captured billing event information. In use, at least one network file is generated in response to a data capture command associated with a communications network, the at least one network file including information associated with a plurality of billing events corresponding to the communication network. Additionally, user input is received to perform at least one operation corresponding to the at least one network file, the at least one operation including at least one of: editing the at least one network file; filtering the at least one network file, based on configurable criteria; replaying at least a portion of the plurality of billing events included in the at least one network file; and generating an event template utilizing at least a portion of the information associated with the plurality of billing events. Further, the at least one operation corresponding to the at least one network file is performed online in accordance with the user input. This file can later be rerun in order to simulate the streaming events at the same or another OCS.

DETAILED DESCRIPTION

Figure 1:
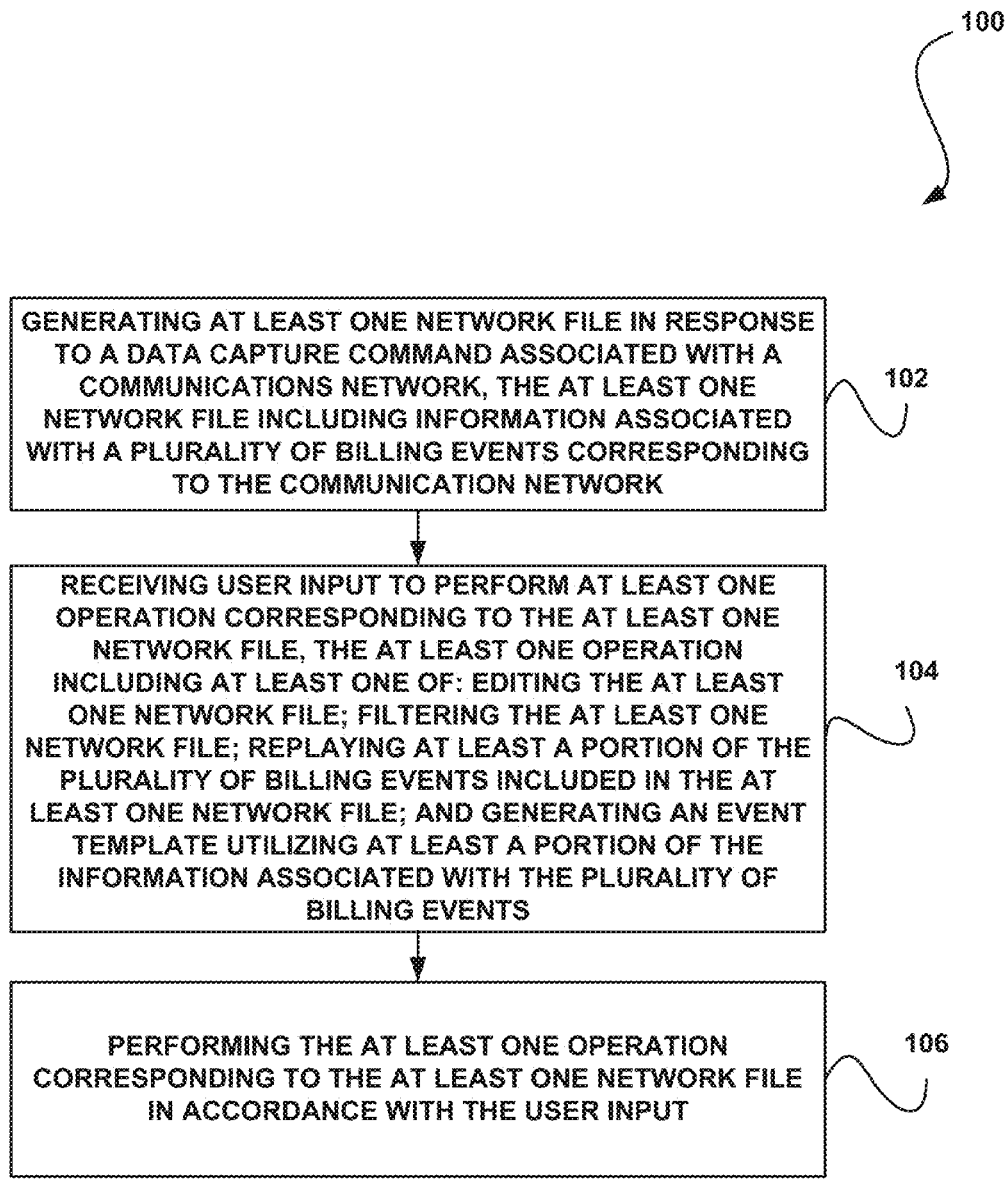
FIG. 1 illustrates a method for performing operations on network files including captured billing event information, in accordance with one embodiment.

FIG. 1 illustrates a method 100 for performing operations on network files including captured billing event information, in accordance with one embodiment.

As shown, at least one network file is generated in response to a data capture command associated with a communications network. See operation 102. The at least one network file includes information associated with a plurality of billing events corresponding to the communication network.

The network file may include any information associated with billing events, such as protocol information, message information, event data, and/or various other information. The capture command may include any command capable of initiating network data capture. For example, in one embodiment, the command may include a TCPDump command. Of course, any command may be utilized, such as a WinDump command, or a Wireshark command, etc.

Additionally, user input is received to perform at least one operation corresponding to the at least one network file (e.g. utilizing a user interface, etc.). The at least one operation includes at least one of: editing the at least one network file; filtering the at least one network file; replaying at least a portion of the plurality of billing events included in the at least one network file; and generating an event template utilizing at least a portion of the information associated with the plurality of billing events. See operation 104.

Further, the at least one operation corresponding to the at least one network file is performed in accordance with the user input. See operation 106.

As an example, receiving the user input to perform the operation corresponding to the network file may include receiving an instruction to filter the network file. In this case, the user input may also include filter criteria for filtering a portion of the information associated with the billing events.

The filter criteria may include any type of criteria. For example, the filter criteria may include an event type. As another example, the filter criteria may include a resource value. Additionally, the filter criteria may include filter criteria associated with multiple conditions (using AND/OR operands) or filter criteria associated with a range (e.g. a time range: Event-Timestamp<x and Event-Timestamp>y, etc.).

In one embodiment, the filter criteria may be capable of including any attribute stored in a predefined configurable attribute dictionary. In this case, a user may generate attributes to be used for filtering, etc.

For example, in one embodiment, receiving user input to perform the operation corresponding to the network file may further include receiving an instruction to define parameters for configuration of filters associated with filtering the network file. In this case, the user input may include the parameters capable of being used for filtering the network file.

As an option, at least one output file may be generated based on the filter criteria provided by a user.

As another example, receiving the user input to perform the operation corresponding to the network file may include receiving an instruction to edit the network file. In this case, the user input may include data for modifying at least one parameter of the network file. Further, as an option, a modified network file including the modified parameter(s) may be generated. In this case, the modified network file may be capable of being used as an input file to a billing system for testing.

As yet another example, receiving the user input to perform the operation corresponding to the network file may include receiving an instruction to replay at least a portion of the billing events included in the network file. As an option, the events included in the at least one network file may be capable of being edited before replaying the events included in the network file.

As another example, receiving the user input to perform the operation corresponding to the network file may include receiving an instruction to generate an event template utilizing at least a portion of the information associated with the billing events. In this case, the user input may include an indication of at least a portion of the information to be used to generate the event template. The event template may include a template of protocol operation of a new request to be used as a new test scenario for a billing system.

Thus, the method 100 may be implemented to filter and edit event generation templates and to use the captured events to regenerate the event for verification and testing processes. In various embodiments, the captured information may be edited for problem detection, resolution, and motoring behavior.

The method 100 allows for application of these techniques in the selected area of telecommunication revenue management events processing with the ability to create a filtered file from the online events, based on real traffic. The method 100 further allows filtering and editing for different keys based on a user defined configuration. The diameter protocol is one example, but such techniques apply to other protocols as well.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

In telecommunication systems, the diameter protocol is carrier of all the telecommunication events. The control fields or the AVP (Attribute value Pair) for diameter include the event specific information that is consumed by the billing system to perform real-time charging, and to perform balance deduction in case of prepaid or quota consumption, based on the event type.

In one embodiment, the TCPDump capture framework may be used to generate dump files (i.e. network files). These dump files may include information for multiple events in a single dump. The techniques described herein and the framework in which they are implemented allow filtering of the events based on event type and resource value, etc. The framework supports filtering by any attribute that is defined in a user defined dictionary (repository).

The framework further allows for editing of the event values in the request before replaying the events. The input to the system may be a .cap file obtained from the TCPDump capture tool, filtering options, and editing options. In addition, this framework can use the captured event structure to create new events. Creating new events is useful for bulk testing. In this case, the framework can create many events out of events that differ in the duplicate keys.

The output file the framework may contain the protocol (e.g. diameter, etc.) messages only without the external pcap headers. In addition, the framework may provide an option to play the selected events during processing of the network file.

Figure 2:
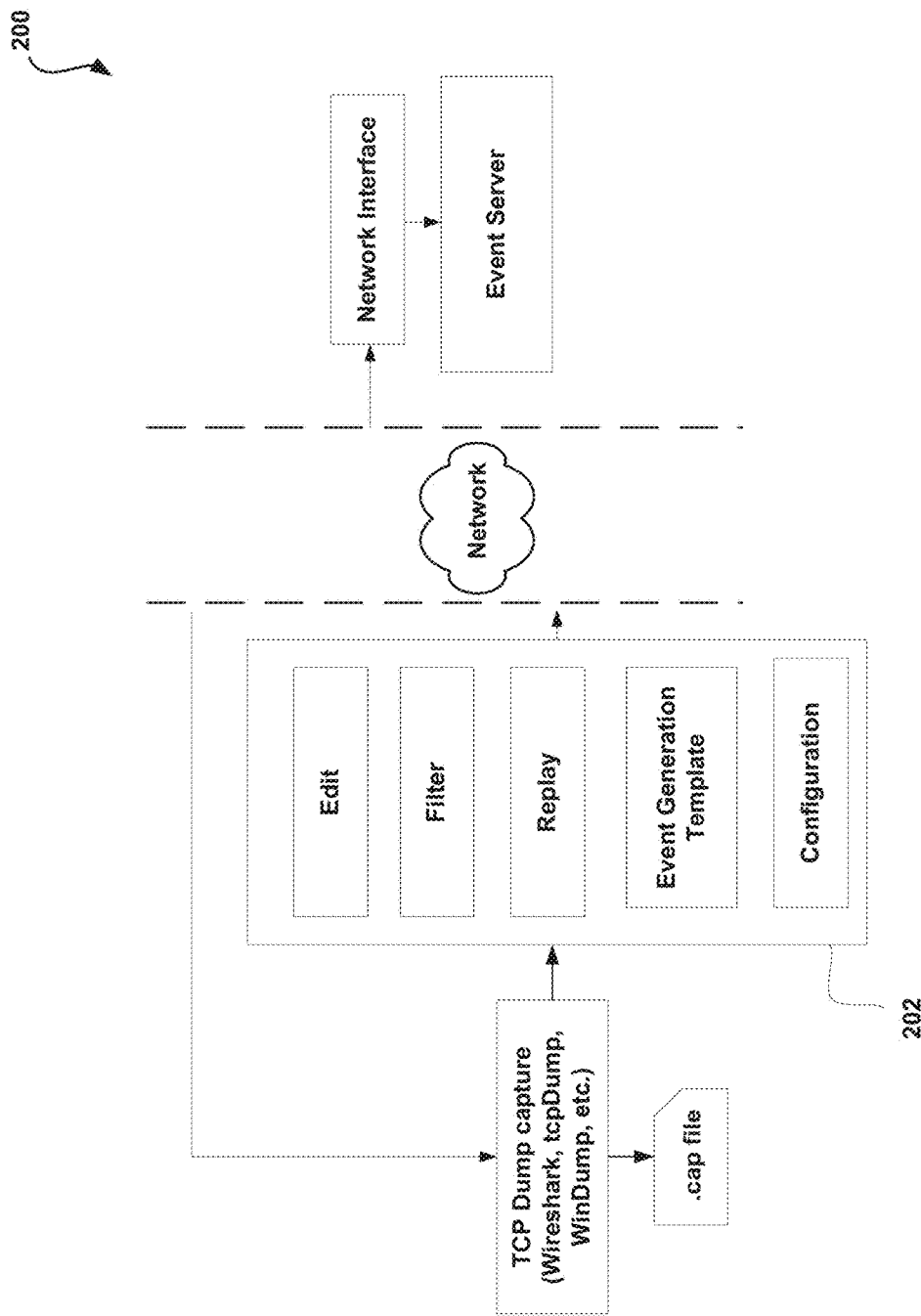
FIG. 2 illustrates a system flow for performing operations on network files including captured billing event information, in accordance with one embodiment.

FIG. 2 illustrates a system flow diagram 200 for performing operations on network files including captured billing event information, in accordance with one embodiment. As an option, the system flow diagram 200 may be implemented in the context of the details of FIG. 1. Of course, however, the system flow diagram 200 may be implemented in the context of any desired environment. Further, the aforementioned definitions may equally apply to the description below.

In operation, a dump capture file (e.g. .cap file) is obtained from a network tap in the network (e.g. filtered on IP and Port, etc.).

The framework 202 offers various operations to be performed on the network file (i.e. the dump capture file). For example, the framework 202 offers edit functionality. The edit functionality allows a user to modify the parameters of the network file in order to generate variable inputs to a billing system.

The framework 202 also offers filter functionality. This functionality allows the framework 202 to filter the network file based on specific event types or attribute values, etc. This functions to filter out specific sets of requests that can be replayed on the network to test or investigate the behavior of previously occurred protocol operations.

The framework 202 also offers replay functionality. This functionality allows resending of the captured protocol operation on network nodes, as had originally occurred in the past.

The framework 202 also offers event generation template functionality. This functionality allows captured information to be used as a template of protocol operation to create a new request. This helps in the testing of new scenarios.

The framework 202 also offers configuration functionality. This functionality allows users to define parameters for configuration of the filters.

Thus, the framework provides 202 filtering, editing, and replaying of the captured events that affect billing systems in telecommunication networks, which is different than network traffic testing (which is communication between multiple servers and client nodes on the same network across different network groups).

The framework 202 also does more than play back the captured network traffic, as the framework 202: allows for editing of the input protocol parameters/values; provides support to filter out specific items from a list of captures based on filtering criteria, such as event type, etc.; uses the network captured event % protocol request to form templates for new requests for testing purposes; and provides a configuration for various possible filtering criteria based on known metadata.

Figure 3:
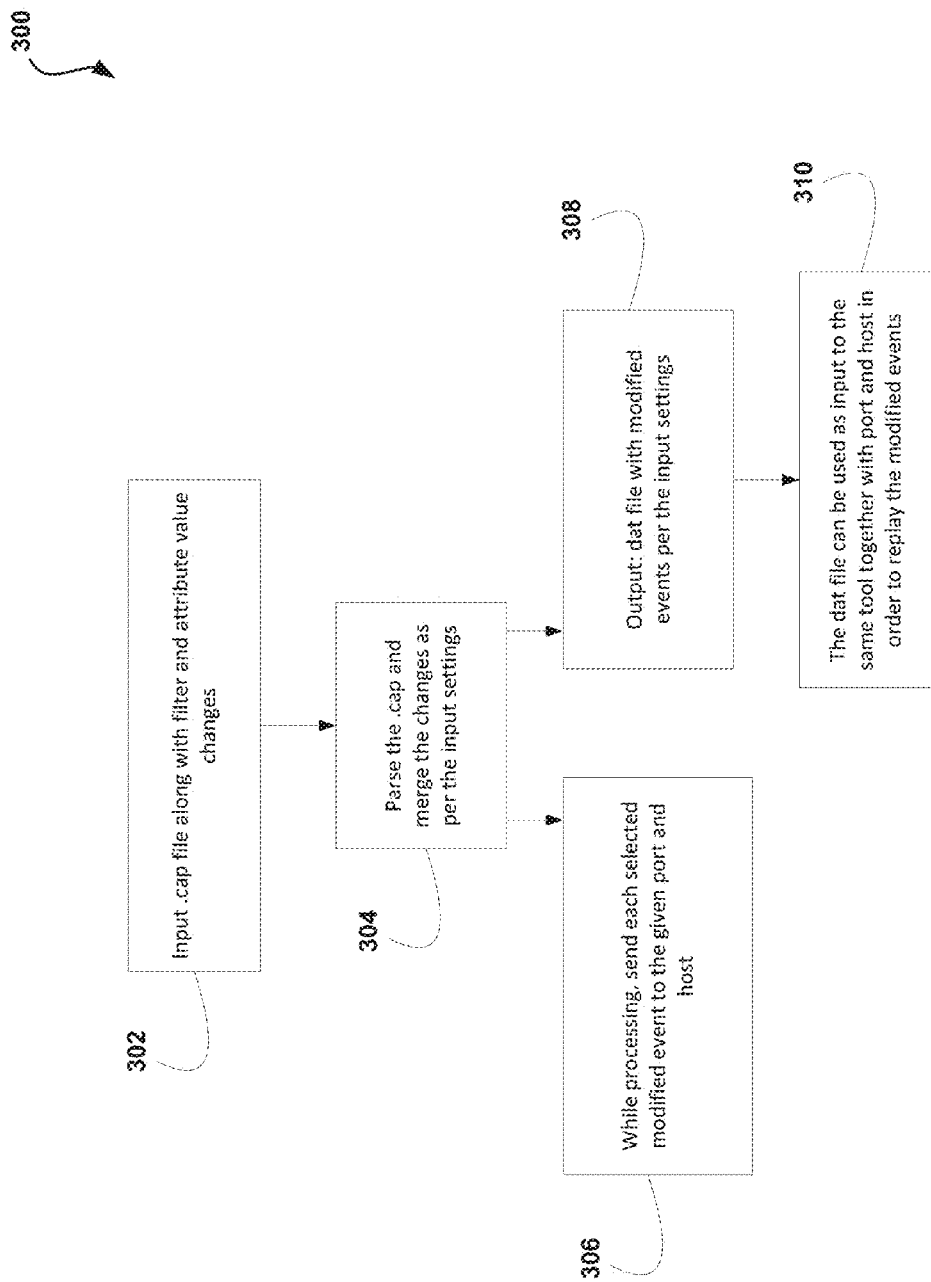
FIG. 3 illustrates a flow diagram of a typical capture, edit/filter, regenerate and replay scenario, in accordance with one embodiment.

FIG. 3 illustrates a flow diagram 300 of a typical capture, edit/filter, regenerate and replay scenario, in accordance with one embodiment. As an option, the flow diagram 300 may be implemented in the context of the details of the previous Figures. Of course, however, the flow diagram 300 may be implemented in the context of any desired environment. Further, the aforementioned definitions may equally apply to the description below.

As shown, a network file (e.g. a .cap file) is input along with filter and attribute value changes (i.e. from a filter an edit operation initiated by a user). See operation 302.

The network file is parsed and the changes are merged as per the input settings. See operation 304.

While processing, each selected modified event is sent to the given port and host. See operation 306.

Further, a file (e.g. a .dat file) with modified events is output per the input settings. See operation 308. The file can be used as input to the same tool/framework together with the port and host in order to replay the modified events. See operation 310.

Figure 4:
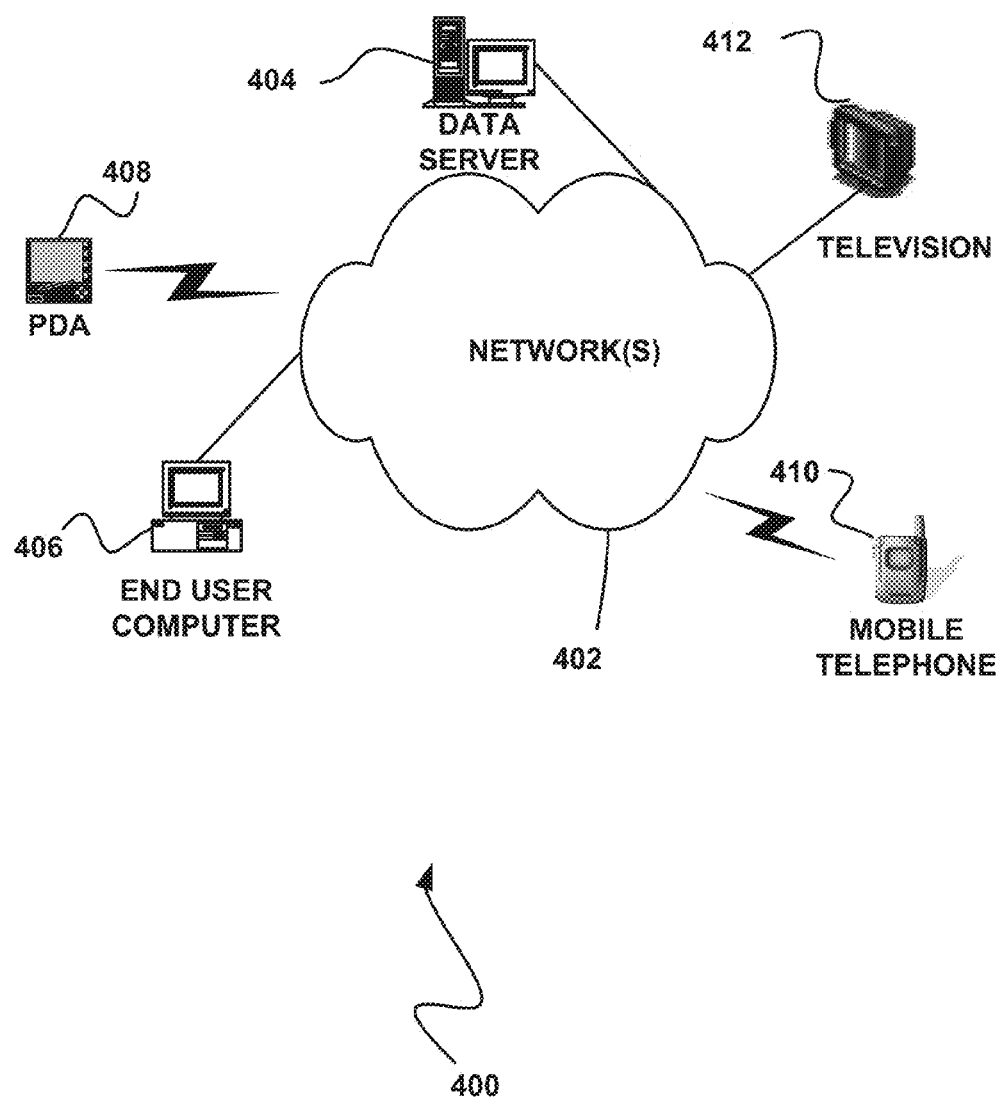
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
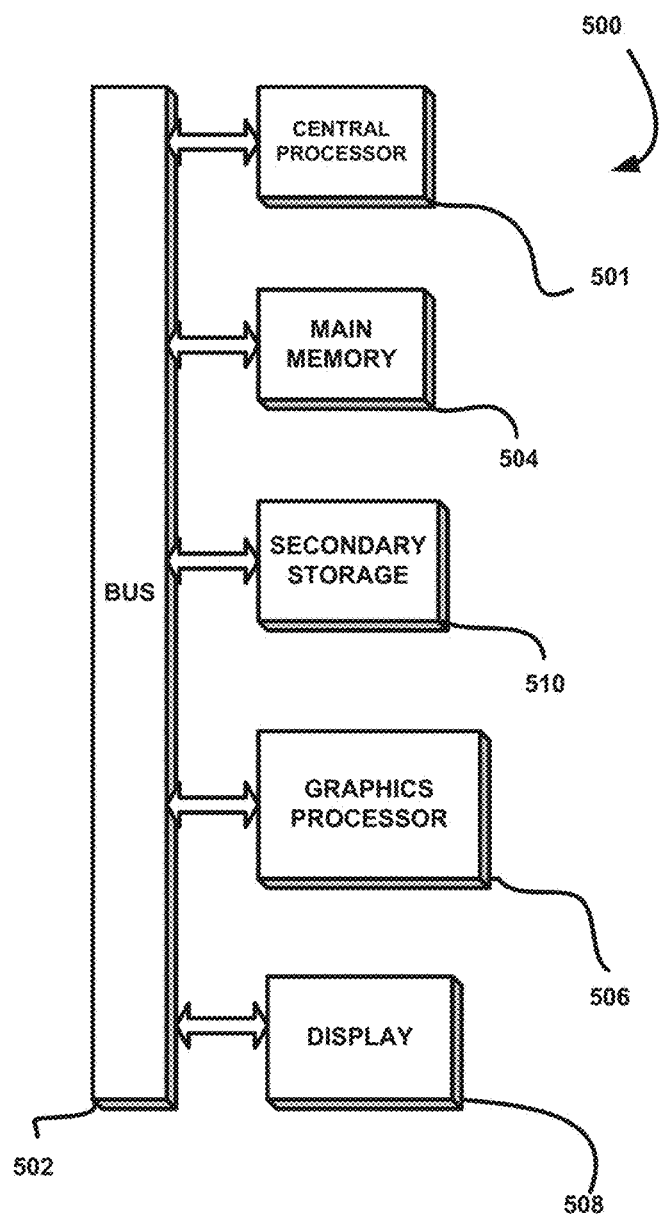
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising computer code for:
   generating at least one network file in response to a data capture command associated with a communications network, the at least one network file including information created utilizing a diameter protocol that includes Attribute Value Pairs (AVPs) representing telecommunications usage events on which real-time charging via a billing system is performed;
   receiving user input through a framework; and
   performing, through the framework, a plurality of operations on the at least one network file in response to the user input, the plurality of operations including:
      editing the at least one network file, including altering parameters in the at least one network file to be used as variable inputs to the billing system for testing,
      filtering the information in the at least one network file utilizing a plurality of filter criteria for the telecommunications usage events including an event type, a resource value, and a time range,
      generating a telecommunications usage event template from the edited and filtered at least one network file for use as a new test scenario for the billing system, and
      inputting the telecommunications usage event template to the framework to perform the testing of the billing system by replaying telecommunications usage events represented in the telecommunications usage event template.

2. The computer program product of claim 1, wherein the computer program product is operable such that receiving the user input includes receiving an instruction to filter the at least one network file.

3. The computer program product of claim 2, wherein the computer program product is operable such that the user input includes the plurality of filter criteria.

4. The computer program product of claim 3, wherein the computer program product is operable such that the filter criteria is capable of including any attribute stored in a predefined configurable attribute dictionary.

5. The computer program product of claim 1, wherein the computer program product is operable such that receiving the user input includes receiving an instruction to edit the at least one network file.

6. The computer program product of claim 5, wherein the computer program product is operable such that the user input includes data for altering the parameters in the at least one network file.

7. A method, comprising:
   generating at least one network file in response to a data capture command associated with a communications network, the at least one network file including information created utilizing a diameter protocol that includes Attribute Value Pairs (AVPs) representing telecommunications usage events on which real-time charging via a billing system is performed;
   receiving user input through a framework; and
   performing, through the framework, a plurality of operations on the at least one network file in response to the user input, the plurality of operations including:
      editing the at least one network file, including altering parameters in the at least one network file to be used as variable inputs to the billing system for testing,
      filtering the information in the at least one network file utilizing a plurality of filter criteria for the telecommunications usage events including an event type, a resource value, and a time range,
      generating a telecommunications usage event template from the edited and filtered at least one network file for use as a new test scenario for the billing system, and
      inputting the telecommunications usage event template to the framework to perform the testing of the billing system by replaying telecommunications usage events represented in the telecommunications usage event template.

8. A system comprising:

a memory system; and one or more processing cores coupled to the memory system for:

generating at least one network file in response to a data capture command associated with a communications network, the at least one network file including information created utilizing a diameter protocol that includes Attribute Value Pairs (AVPs) representing telecommunications usage events on which real-time charging via a billing system is performed;

receiving user input through a framework; and performing, through the framework, a plurality of operations on the at least one network file in response to the user input, the plurality of operations including:

editing the at least one network file, including altering parameters in the at least one network file to be used as variable inputs to the billing system for testing, filtering the information in the at least one network file utilizing a plurality of filter criteria for the telecommunications usage events including an event type, a resource value, and a time range, generating a telecommunications usage event template from the edited and filtered at least one network file for use as a new test scenario for the billing system, and inputting the telecommunications usage event template to the framework to perform the testing of the billing system by replaying telecommunications usage events represented in the telecommunications usage event template.

* * * * *